(12) United States Patent
Wang et al.

(10) Patent No.: US 11,115,258 B2
(45) Date of Patent: Sep. 7, 2021

(54) METHOD TO IMPLICITLY INDICATE SYSTEM INFORMATION IN NR

(71) Applicant: Telefonaktiebolaget LM Ericsson (publ), Stockholm (SE)

(72) Inventors: Jianfeng Wang, Beijing (CN); Henrik Sahlin, Mölnlycke (SE); Yanli Zheng, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/464,082

(22) PCT Filed: Dec. 26, 2016

(86) PCT No.: PCT/CN2016/112065
§ 371 (c)(1),
(2) Date: May 24, 2019

(87) PCT Pub. No.: WO2018/119563
PCT Pub. Date: Jul. 5, 2018

(65) Prior Publication Data
US 2019/0288899 A1    Sep. 19, 2019

(51) Int. Cl.
*H04L 27/26* (2006.01)
*H04L 5/00* (2006.01)

(52) U.S. Cl.
CPC ........ *H04L 27/2666* (2013.01); *H04L 5/0048* (2013.01); *H04L 5/0092* (2013.01);
(Continued)

(58) Field of Classification Search
CPC . H04L 27/2613; H04L 27/26; H04L 27/2666; H04L 27/2692; H04L 5/0092; H04L 5/0048
See application file for complete search history.

(56) References Cited

U.S. PATENT DOCUMENTS 7,142,584 B1 * 11/2006 Bomer ............. H04W 56/0085
375/145
10,575,186 B2   2/2020 Ode et al.
(Continued)

FOREIGN PATENT DOCUMENTS

CN    101102149 A    1/2008
CN    101374129 A    2/2009
(Continued)

OTHER PUBLICATIONS

Chinese Office Action and Search Report with English Machine Translation dated May 19, 2021 for Patent Application No. 201680091870.1, consisting of 16-pages.

*Primary Examiner* — Ajay Cattungal
(74) *Attorney, Agent, or Firm* — Christopher & Weisberg, P.A.

(57) ABSTRACT

This disclosure pertains to a method for operating a network node (100) in a radio access network. The method comprises transmitting synchronisation signaling, the synchronisation signaling comprising a signaling sequence, the signaling sequence being determined as a combination of a number of sub-sequences, wherein an order of the sub-sequences is mapped to synchronisation information. The disclosure also pertains to related devices and methods.

19 Claims, 10 Drawing Sheets

(52) U.S. Cl.
CPC .......... *H04L 27/26* (2013.01); *H04L 27/2613* (2013.01); *H04L 27/2692* (2013.01)

(56) References Cited

U.S. PATENT DOCUMENTS

| | | | |
|---|---|---|---|
| 2004/0128578 A1* | 7/2004 | Jonnalagadda | H04J 3/0691 |
| | | | 713/400 |
| 2006/0153282 A1 | 7/2006 | Jung et al. | |
| 2013/0250818 A1 | 9/2013 | Gaal et al. | |
| 2014/0050206 A1 | 2/2014 | Seo et al. | |
| 2016/0013879 A1 | 1/2016 | Webb et al. | |
| 2016/0142898 A1* | 5/2016 | Poitau | H04W 72/0446 |
| | | | 370/329 |
| 2017/0257249 A1* | 9/2017 | Hong | H04L 27/261 |
| 2018/0063721 A1* | 3/2018 | Ode | H04W 16/14 |
| 2018/0270095 A1* | 9/2018 | Ahmad | H04L 27/2692 |
| 2018/0309533 A1* | 10/2018 | Yoshimoto | H04W 72/0453 |
| 2019/0028224 A1* | 1/2019 | Kim | H04L 27/2678 |
| 2019/0089504 A1* | 3/2019 | Hwang | H04L 27/26 |
| 2020/0059873 A1* | 2/2020 | Takeda | H04J 11/0076 |

FOREIGN PATENT DOCUMENTS

| | | | |
|---|---|---|---|
| CN | 105052051 A | 11/2015 | |
| EP | 2184873 A1 | 5/2010 | |
| WO | 2014147397 A1 | 9/2014 | |
| WO | 2016181538 A1 | 11/2016 | |

* cited by examiner

METHOD TO IMPLICITLY INDICATE SYSTEM INFORMATION IN NR

TECHNICAL FIELD

The present disclosure pertains to wireless communication technology, in particular in the context of synchronisation signaling.

BACKGROUND

New approaches to wireless communication technology are being introduced, e.g. in the context of 3GPPs 5G technologies like New Radio (NR) or LTE Evolution. These approaches in many cases lead to highly flexible systems. However, with high flexibility may be detrimental to speed of the system, and/or incur inefficiencies in particular by introducing control signaling overhead.

SUMMARY

It is an object of the present disclosure to provide approaches facilitating efficient use of synchronisation signaling in a radio access network (RAN), which in particular may be a RAN according to LTE Evolution (in particular, LTE Rel. 14 and later) and/or NR.

Accordingly, there is disclosed a method for operating a network node in a radio access network, the method comprising transmitting synchronisation signaling, the synchronisation signaling comprising a signaling sequence, the signaling sequence being determined as a combination of a number of sub-sequences, wherein an order of the sub-sequences is mapped to synchronisation information. The method may comprise configuring a user equipment with a corresponding mapping.

A network node for a radio access network may be considered. The network node may be adapted for transmitting synchronisation signaling, the synchronisation signaling comprising a signaling sequence, the signaling sequence being determined as a combination of a number of sub-sequences, wherein an order of the sub-sequences is mapped to synchronisation information. The network node may comprise, and/or be adapted for using, processing circuitry and/or radio circuitry, in particular a transmitter, for such transmitting. Alternatively or additionally, the network node may comprise a transmitting module for such transmitting. The network node may be adapted for configuring a user equipment with a corresponding mapping, and/or for using processing circuitry and/or radio circuitry for such configuring, and/or may comprise a configuring module for such configuring.

Moreover, a method for operating a user equipment in a radio access network is proposed. The method comprises determining synchronisation information based on received synchronisation signaling, the synchronisation signaling comprising a signaling sequence, which is composed of a combination of a number of sub-sequences, wherein an order of the sub-sequences is mapped to the synchronisation information.

A user equipment for a radio access network is also described. The user equipment is adapted for determining synchronisation information based on received synchronisation signaling, the synchronisation signaling comprising a signaling sequence, which is composed of a combination of a number of sub-sequences, wherein an order of the sub-sequences is mapped to the synchronisation information. The user equipment may comprise, and/or be adapted for using, processing circuitry and/or radio circuitry, in particular a receiver, for such determining. Additionally or alternatively, the user equipment may comprise a determining module for such determining.

Determining the synchronisation information may comprise, and/be based on, demodulating and/decoding and/or detecting the synchronisation signaling or the sequence or subsequences, respectively. This may comprise determining a best hypothesis for the signaling or (sub-)sequences to determine a correct (or best) signaling sequence.

Generally, the synchronisation signaling may repeat, within a time interval, the signaling sequence. The order of the sub-sequence may change between repetitions. It may be considered that the time interval comprises or represents a subframe and/or slot and/or transmission time interval and/or synchronisation signaling block or synchronisation signaling burst or burst set.

Generally, the sequence may be mapped to different subcarriers of the same symbol or different symbols. Mapping of the sequence may comprise mapping the subsequences, e.g. to subcarriers and/or resource elements. For different repetitions of the sequence, different mappings of the (same) subsequences to the (same) subcarriers may be used.

Each sub-sequence may generally be chosen from a set of subsequences. It may be considered that each set of subsequences is different from the other sets. A set may be considered to be different from another set if it contains at least one sub-sequence not in the other subset, or vice versa. Different subsets may comprise the same or different numbers of subsequences. In some variants, each subset may contain unique subsequences not contained in any other subset. This allows particularly easy identification.

It may be considered that a sub-sequence from each set (a chosen subsequence) is mapped to a subcarrier.

A sub-sequence may generally comprise one or more signals, which may be adapted in some variant to have each (e.g., significantly) shorter duration than a symbol time interval. Synchronisation signaling may be considered to be different in types of transmission mode and/or modulation than symbols (e.g. OFDM symbols) of normal operation, e.g. during data transmission. It may be considered that synchronisation signaling is associated to, and/or transmitted and/or received on, a broadcast channel, in particular a physical broadcast channel, e.g. a PBCH according to a 3GPP standard like LTE or NR, and/or a similar channel according to another standard. The channel may be part of, and/or be associated to the cell the synchronisation signaling is associated to.

Additionally, there may be considered a program product comprising instructions causing processing circuitry to carry out and/or control performing of any one of the methods discussed herein. The instructions may be provided in form of code, and/or may be executable by the processing circuitry.

A carrier medium arrangement carrying and/or storing a program product described herein is also proposed. A carrier medium arrangement may comprise one or more carrier media. Generally, a carrier medium may be accessible and/or readable and/or receivable by processing circuitry. Storing data and/or a program product and/or code and/or instructions may be considered part of carrying data and/or a program product and/or code and/or instructions. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Synchronisation signaling may comprise one or more signals or symbols. In particular, synchronisation signaling may comprise a signaling or symbol series, and/or a signaling sequence. A series and/or the signaling may comprise one or more sequences, and in particular may repeat one sequence a once or more, e.g. in a burst or burst set.

A signaling sequence may be defined by its subsequences, of which it may be composed. Different sequences may comprise different subsequences, in particular may differ in at least on subsequence. It should be noted that the order of the subsequences in the sequence may not be considered to define the sequence. Thus, different orders of the same subsequences may be considered to represent the same sequence. A set of subsequences may comprise one or more subsequences.

An order may in particular pertain to an interleaving order, respectively pertain to an order or arrangement or mapping of the subsequences to subcarriers.

A symbol as described herein may in particular be an OFDM symbol, or a DFTS-symbol, and/or may represent a symbol time interval, e.g. according to a standard mentioned herein.

It may be considered that a mapping is represented by a table and/or relation and/or function. The mapping may be represented in a memory and/or configured to a user equipment, e.g. by a network node. The user equipment may be adapted for receiving a corresponding configuration, and/or may be adapted for using processing circuitry and/or radio circuitry, in particular a receiver, for such receiving. Alternatively or additionally, it may comprise a corresponding receiving module.

Synchronisation information may generally comprise information pertaining to synchronisation and/or cell search and/or transmission mode and/or measurements, in particular pertaining to the cell the synchronisation signaling the synchronisation signaling is associated to. Examples of synchronisation information comprise information indicating a location and/or timing and/or symbol or burst or block number or index (relative to a related time interval) and/or cell information, a cell ID and/or physical cell ID, and/or periodicity of the signaling, e.g. of burst or blocks. Depending on the number of subcarriers and/or subsequences or sets available, different information and/or different combinations of information may be available. Information pertaining to transmission mode may for example indicate modulation scheme and/or duplex mode and/or requirements on the UE (e.g., regarding power class and/or capabilities) used for the cell and/or characteristic/s capability/ies of the network node or the cell.

The synchronisation signaling may be secondary synchronisation signaling, accessible (decodable and/or demodulatable) after decoding and/or demodulating primary synchronisation signaling. Synchronisation signaling may be transmitted and/or associated to a synchronisation frequency interval, which may comprise a plurality of subcarriers. For example, 6 or 12 or more subcarriers may be associated to the synchronisation signaling.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. A carrier may be associated to a cell and/or one or more (physical) channels.

A radio node may generally be considered a device or node adapted for wireless and/or radio (and/or microwave) frequency communication, and/or for communication utilising an air interface, e.g. according to a communication standard.

A network node or a user equipment or terminal may be considered a radio node. A network node may be any radio node of a wireless communication network, e.g. a base station and/or gNodeB (gNB) and/or relay node and/or micro/nano/pico/femto node and/or other node, in particular for a RAN as described herein. A radio node may generally comprise a memory storing information indicating the mapping and/or the sequences and/or the subsequences and/or the sets.

The terms user equipment (UE) and terminal may be considered to be interchangeable in the context of this disclosure. A user equipment or terminal may represent and end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or harddisk memory, and/or EPROM or EEPROM (Erasable Programmable ROM or Electrically Erasable Programmable ROM). Radio circuitry may comprise one or more transmitters and/or receivers and/or transceivers (which may operate as transmitter and receiver), and/or may comprise one or more amplifiers and/or oscillators and/or filters, and/or may comprise, and/or be connected or connectable to antenna circuitry and/or one or more antennas. A radio node may be adapted for using its processing circuitry and/or radio circuitry to perform any of the methods described herein and associated to it.

Any one or all of the modules disclosed herein may be implemented in software and/or firmware and/or hardware. Different modules may be associated to different components of a radio node, e.g. different circuitries or different parts of a circuitry. It may be considered that a module is distributed over different components.

BRIEF DESCRIPTION OF THE DRAWINGS

The drawings are provided to elucidate the approaches and ideas described herein, and are not intended to limit them.

The drawings comprise.

DETAILED DESCRIPTION

Synchronization in LTE is described in the following.

Figure 1:
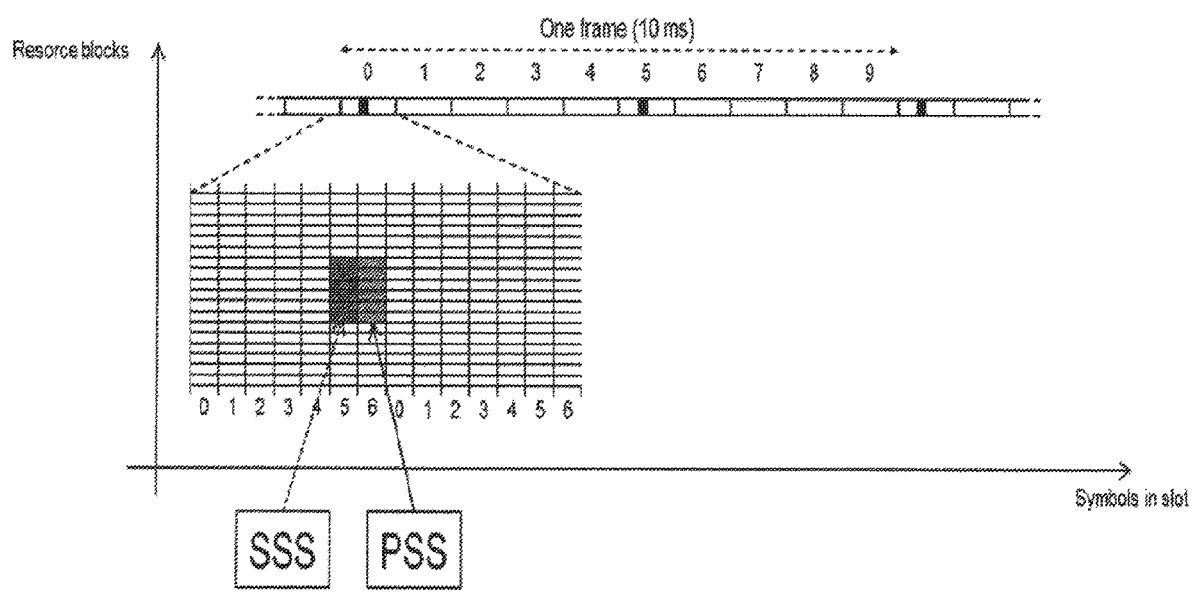
FIG. 1, showing an example of synchronisation signaling in LTE.

When a UE is powered on, or when it moves between cells in LTE release 8, it receives and synchronizes to downlink signals in a cell search procedure. The purpose of this cell search is to identify the best cell and to achieve time and frequency synchronization to the network in downlink (i.e. from base station to UE). The Primary and Secondary Synchronization Signals (PSS and SSS) are used at cell search in the UE for LTE. Here, in the case of FDD, the PSS is transmitted in the last OFDM symbol of slots 0 and 10 within a frame and the SSS is transmitted in the OFDM symbol preceding PSS, as shown in FIG. 1. In the case of TDD, the PSS is transmitted in the third OFDM symbol of slots 3 and 13 within a frame, and the SSS is transmitted in the last OFDM symbol of slots 2 and 12, i.e., three symbols ahead of the PSS.

Figure 2:
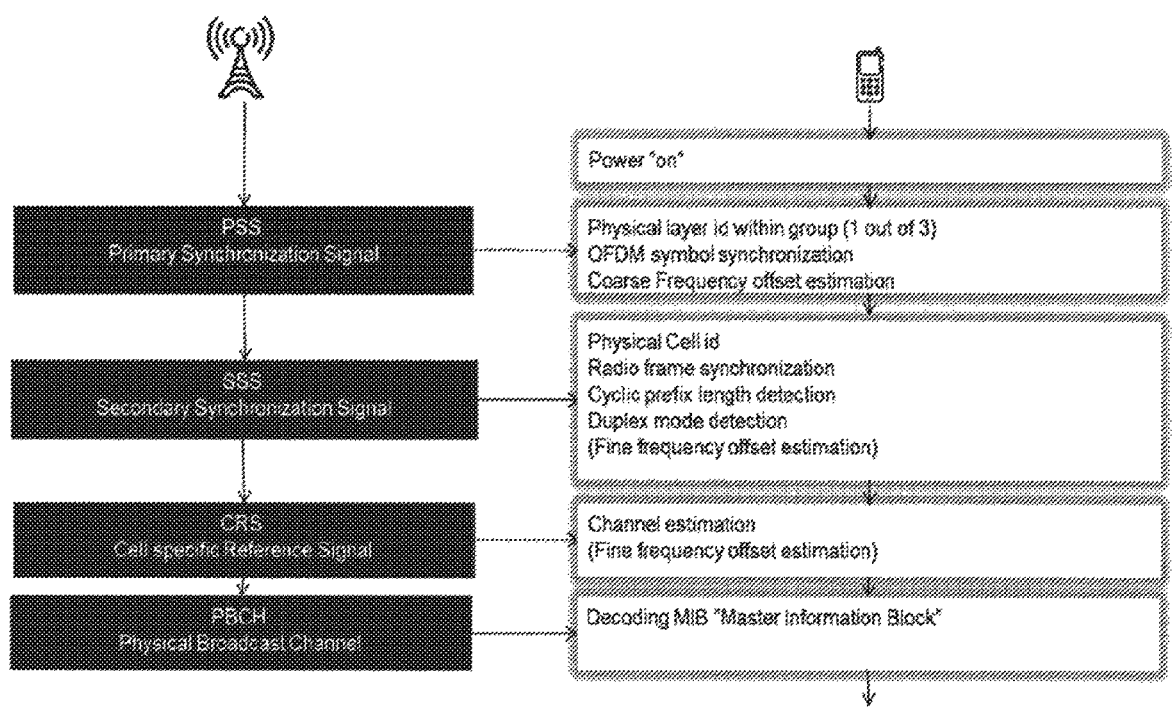
FIG. 2, showing schematically a cell search procedure for LTE release 8.

A simplified initial cell search procedure is illustrated in FIG. 2. Therein, the UE tries to detect PSS from which it can derive the cell identity within a cell-identity group, which consists of three different cell identities corresponding to three different PSS. In this detection, the UE thus has to blindly search for all of these three possible cell identities. The UE also achieves OFDM symbol synchronization and a coarse frequency offset estimation with an accuracy of about 1 kHz. The latter is estimated by the UE by evaluating several hypotheses of the frequency error.

The UE can then continue to detect SSS (coherent detection may be performed due to PSS having been decoded) from which it acquires the physical cell id and achieves radio frame synchronization. Here, the UE also detects if a transmission mode with normal or extended cyclic prefix is used. If the UE is not preconfigured for either TDD or FDD, the UE can detect the duplex mode by the position of the detected SSS in the frame in relation to detected PSS. Fine frequency offset estimation can be estimated by correlating PSS and SSS. Alternatively, this fine frequency offset estimation is estimated by using the Cell specific Reference Signals (CRS) which are derived from the Physical Cell Identity (PCI) encoded in the PSS/SSS. Once the UE is capable of decoding the CRSs the UE can receive and decode cell system information which contains cell configuration parameters starting with the Physical Broadcast Channel (PBCH).

Synchronization in NR is described in the following.

There may be at least two types of synchronization signals, denoted as NR-PSS and NR-SSS, which may provide the basic functionality of facilitating time and frequency synchronization for the initial access or cell search, similar to the PSS and SSS, respectively.

As described above, initial downlink synchronization may be provided with a pre-defined sequence of signaling. There are various requirements in NR, including such aimed at energy saving, various numerologies and high carrier frequencies. The transmission on periodical and static signals may be needed to be decreased and should be more flexible in various aspects. For the initial access, e.g., because system or random access information may have become invalid or updated, the synchronization signals may be transmitted periodically in downlink for UEs to obtain the downlink synchronization, to allow following demodulation or decoding of the relevant system and random access information.

Figure 3:
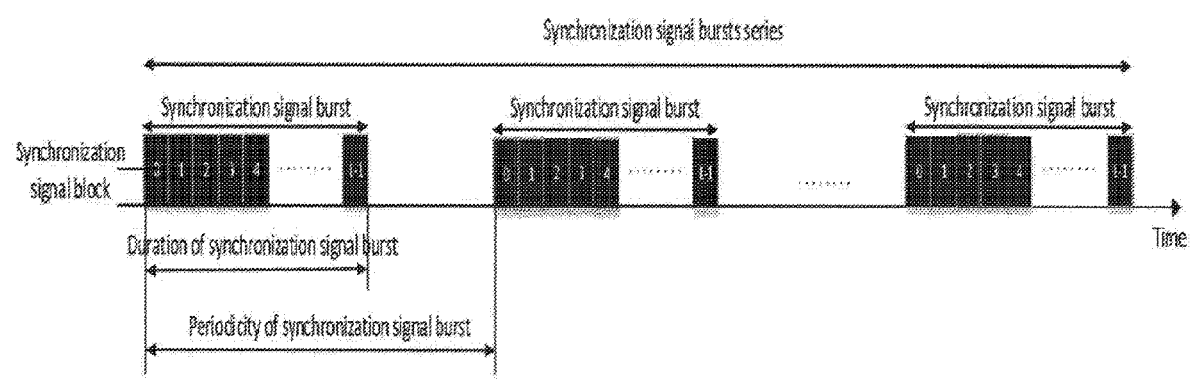
FIG. 3, showing an illustration of a SS block, SS burst and SS burst set.

NR-PSS, NR-SSS, and even some basic system information may be transmitted within a SS (Synchronisation Signaling) block. One or multiple SS block(s) may compose an SS burst, and one or multiple SS burst(s) may compose a SS burst set, as shown in FIG. 3.

Some characteristics synchronisation signaling should have may comprise:

It should support flexible beamforming schemes, such as beam sweeping; and/or

It should allow obtaining subframe level synchronization for random access; and/or It should require little overhead, e.g. no extra information bits to indicate the beam and/or time index.

In summary, it may be desirable to acquire 'subframe-level' synchronization, 'SS block time index', 'beam index' and/or possibly other information from SSS detection without extra information delivery (overhead).

A new design of synchronization signaling, in particular secondary synchronisation signaling, is proposed, which may comprise a (signal) sequence to implicitly deliver information, such as OFDM symbol offset and SS block time index information. In particular, such information may be (implicitly) indicated to a UE by an interleaving orders of pre-defined sets of component sequences, such that different interleaving orders may represent different information.

This approach does not require extra information bits to be delivered to indicate the information, such as SS block time index. Moreover, it is flexible to be extended to support more information delivery without explicit information bits and is considered to have low detection complexity.

An exemplary construction on the synchronization signaling is described in the following, based on the sequence design proposal, as well as a detection algorithm and the usage of the implicit information. It is referred to secondary synchronisation signaling by way of example, but the approach or design may be implemented for other synchronisation signaling as well, in particular tertiary synchronisation signaling, if implemented. Generally, secondary synchronisation signaling may be considered to refer to synchronisation signaling of any order higher than primary, and/or require (successful) synchronisation to at least primary synchronisation signaling.

A secondary synchronization signaling sequence can be transmitted on one symbol, e.g. one OFDM symbol. Its length, $L_{ss}$, is not larger than the number of resource elements reserved, $N_{ss}$, i.e., $L_{ss} \leq N_{ss}$. In LTE, as introduced above, the subcarriers on a certain OFDM symbol of the center six PRBs are reserved for the SSS, i.e., $N_{ss}=72$, and $L_{ss}=62$. For NR, the bandwidth reserved for the synchronization signal might be different, e.g., larger.

A number $K_{ss}$ of basic system information, e.g., $K_{ss}$ cell identities may be mapped to and/or assigned to, sequences, and the equivalent number of information bits of such sequence-based delivery can be regarded as $\lceil \log_2 K_{ss} \rceil$. In LTE, $K_{ss}=168$ is defined to indicate the selected identity of the group for a cell, where three identities are further delivered by PSS.

To construct one (long) sequence, Q component sequences (also denoted as sub-sequences in this disclosure) may further be defined. These Q component sequences may be selected from Q component sequence sets. Each sub-sequence may be selected from one set. Thus, the sub-sequence would have a length of $L_{SSC}=L_{ss}/Q$ (assuming $L_{ss}$ can be divided by Q), and there are $$K_C = \sqrt[Q]{K_{SS}}$$

candidate sub-sequences in each sub-sequence set (which also indicates that there are total $QK_c$ sub-sequences from all sets in total). The $q^{th}$ sub-sequence set may be denoted as $$SSC^{(q)}=\{SSC_0^{(q)}, SSC_1^{(q)}, \ldots, SSC_{K_c-1}^{(q)}\},$$

where $SSC_m^{(q)}$ means the $m^{th}$ sub-sequence, $0 \leq m \leq K_c-1$, in the $q^{th}$ sub-sequence set, $0 \leq q \leq Q-1$. If using the SSS in LTE as the reference, the parameters above can be derived as Q=2 for the two sub-sequence sets, and $L_{ssc}=31$. To indicate the group id from the total 168 candidates, $K_{ss}=168$, the candidates in either sets can be regarded as $$K_c = \lceil \sqrt[2]{168} \rceil = 13.$$

Note that a component sequence can be flexibly selected, and in this proposal, a BPSK-modulated m-sequence may represent a component sequence. However, other types of modulation may be used for a sequence.

In following, the selection on the sub-sequences from all sets and construction with a certain interleaving order is introduced in detail.

Figure 4:
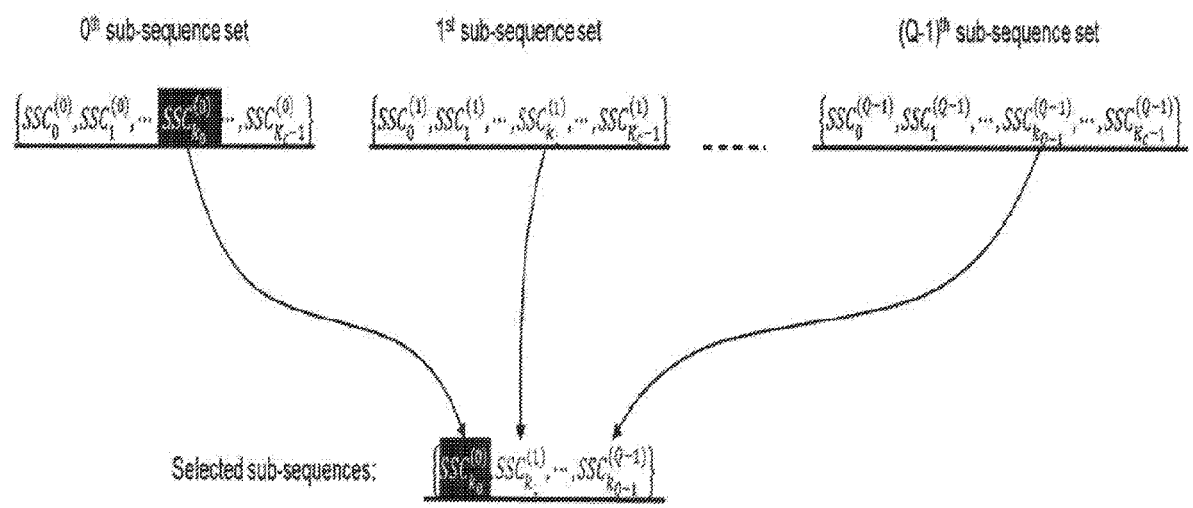
FIG. 4, showing a sub-sequences selection from Q sub-sequence sets.

For a certain synchronization signaling sequence to indicate the group ID k, Q component sequences may be selected from the Q sub-sequence sets one by one. The selected sub-sequence in the $q^{th}$ set is denoted as $SSC_{k_q}^{(q)}$, $0 \leq q \leq Q-1$, wherein $k_q$ is the sequence index in the $q^{th}$ set, $0 \leq k_q \leq K_c-1$. The selection procedure is illustrated in FIG. 4. It should be noted that a group ID k is may be indicated by a vector $\{k_0, k_1, \ldots, k_{Q-1}\}$, which may be pre-defined or determined before being interleaved to construct the final sequence.

Thus, the selected sequence to explicitly indicate the group ID k with the selected sub-sequences can be denoted as $$SSS_k=\{SSC_{k_0}^{(0)}, SSC_{k_1}^{(1)}, \ldots, SSC_{k_{Q-1}}^{(Q-1)}\},$$

The next step is to further construct the sequence with these component sequences with a certain interleaving order. In theory, the maximum number of interleaving orders is the factorial of Q, e.g., Q=3 means there are maximum six orders, and Q=4 would have 24 orders. An order in this context may represent in which order the chosen sequences are arranged, e.g. interleaved.

Figure 5:
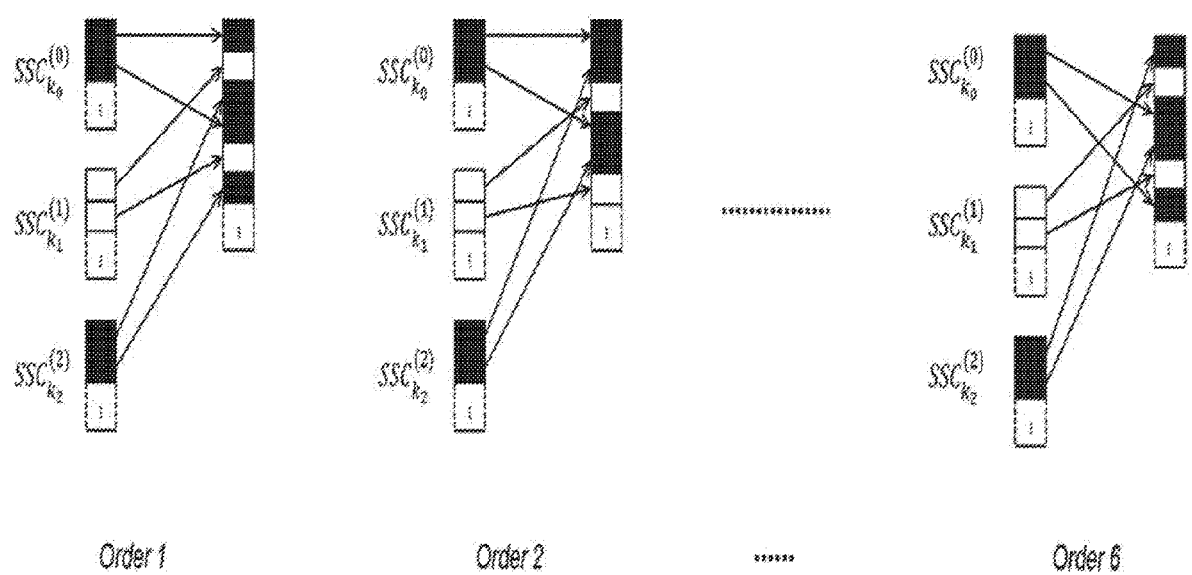
FIG. 5, showing SSS construction with different SSCs interleaving orders.

To better explain the proposal, the construction with Q=3 is illustrated in FIG. 5. As shown in FIG. 5, for the "Order 1", the first element of $SSC_{k_0}^{(0)}$ is followed by the first element of $SSC_{k_1}^{(1)}$ and the first element of $SSC_{k_2}^{(2)}$ in order, and so on for the following elements of the sub-sequences. For "Order 2", the first element of $SSC_{k_0}^{(0)}$ is followed by the first element of $SSC_{k_2}^{(2)}$ and the first element of $SSC_{k_1}^{(1)}$ in order. In total, there are six possible orders to interleave the selected sub-sequences.

A design with some typical NR system configurations is further illustrated. In NR, the bandwidth reserved for the SS block is proposed to be larger than the PSS/SSS/PBCH in LTE, even on a carrier frequency lower than 6 GHz. For the numerology with 15 kHz subcarrier spacing, if four times of LTE PBCH bandwidth is used, i.e., 4.32 MHz with 288 subcarriers, $N_{ss}=288$, and a length of $L_{ss}=252$ second synchronization signal sequences can be generated with Q=4 component sequences with length of $L_{ssc}=63$. Then, there are 24 interleaving orders which can be used to indicate the information implicitly without a complex detection algorithm, and the mapping between the order and the implicit information to be delivered should be pre-defined, which will be introduced in the following sections.

The detection of NR-SSS would follow the NR-PSS successful detection, analogous to the approach shown in FIG. 2. From the UE's point of view, the SSS detection is done after the PSS detection, and the channel can therefore be assumed to be known (i.e. estimated based on the detected PSS sequence).

Once having achieved symbol-level synchronization, the possible position of NR-SSS can be determined according to the predefined time and/or frequency offset in relation to the NR-PSS, and the corresponding samples can be converted to the frequency domain via FFT (Fast Fourier Transform) to further scan and detect the selected component subsequences from the sub-sequence sets.

From the detected component sub-sequences, the identity information, e.g., cell id, can be delivered, and the order of the sub-sequences can be used to derive the implicit information, e.g., SS block index, according to a pre-defined mapping between the order and the implicit information. An exemplary detection procedure is illustrated in FIG. 6.

Figure 6:
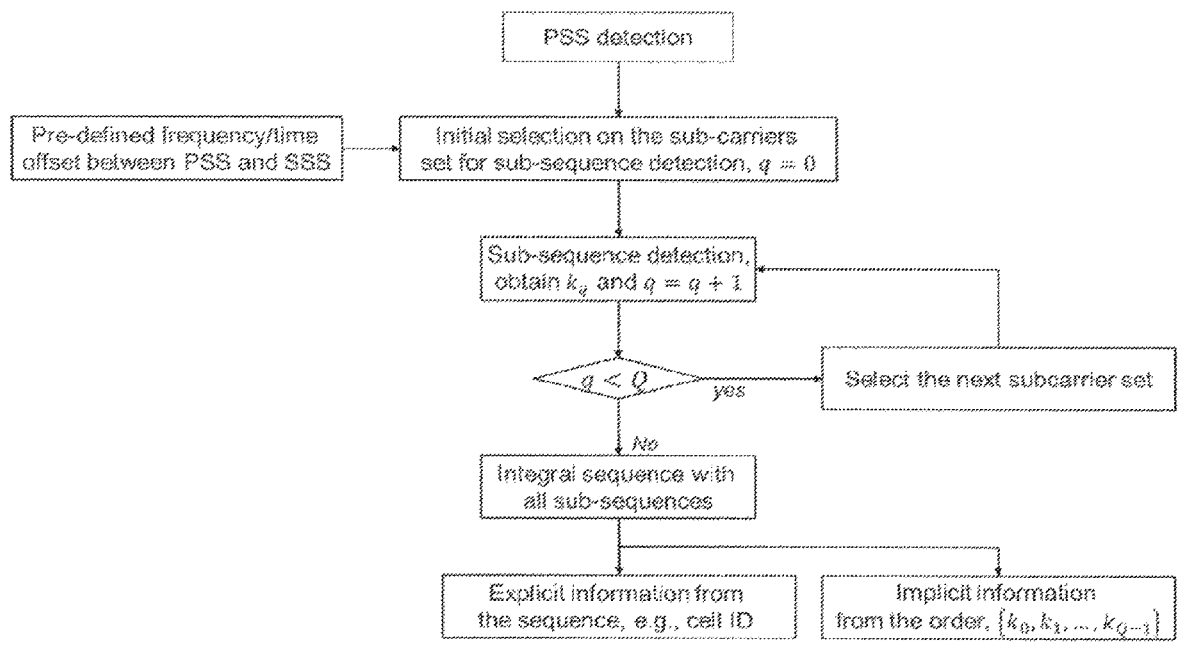
FIG. 6, showing SSS detection with sub-sequence and interleaving order detection.

As shown in FIG. 6, after successful detection on the NR-PSS, the time and frequency location of the allocated NR-SSS can be derived accordingly, which is analogous to the approach shown in FIG. 1 for LTE. Then, the received signals on a set of subcarriers may be selected for the following detection.

The initial subcarrier set is decided and/or determined by the number of component sequence sets, i.e., one subcarrier may be selected in every Q subcarriers as illustrated in FIG. 5. All the component sequences could be used to assist coherent or non-coherent detection.

For each iteration, the best component sequence for each set may be selected. After all iterations, the detected component sequences can be integrated as the final NR-SSS sequence, whose identity is used to indicate the explicit information, e.g., cell ID. The order of the component sequences is used to indicate the implicit information as introduced in the next section.

As the NR-SSS sequence is composed by several different sub-sequences, which may be allocated in a comb manner in frequency domain, the sub-sequences can also be detected separately or jointly.

Implicit indication with the interleaving order is discussed in the following.

In this section, the usage of the interleaving order to indicate the information would be introduced by pre-defined a mapping between the order and the implicit information.

OFDM (Orthogonal Frequency Division Multiplexing) symbol offset indication is described. In NR, several beams will be supported with massive MIMO (Multiple Input, Multiple Output, a multi-antenna scheme), and the system design may consider to support massive beams (massive beams may refer to a large number of possible beam). For example, beam sweeping in the time domain is a promising scheme to provide a wide coverage, especially for broadcast information and signals, e.g., NR-PSS and NR-SSS. For the same cell (or a logical coverage with some common system information), it is supposed to deliver the cell id in a time duration with beam sweeping.

Figure 7:
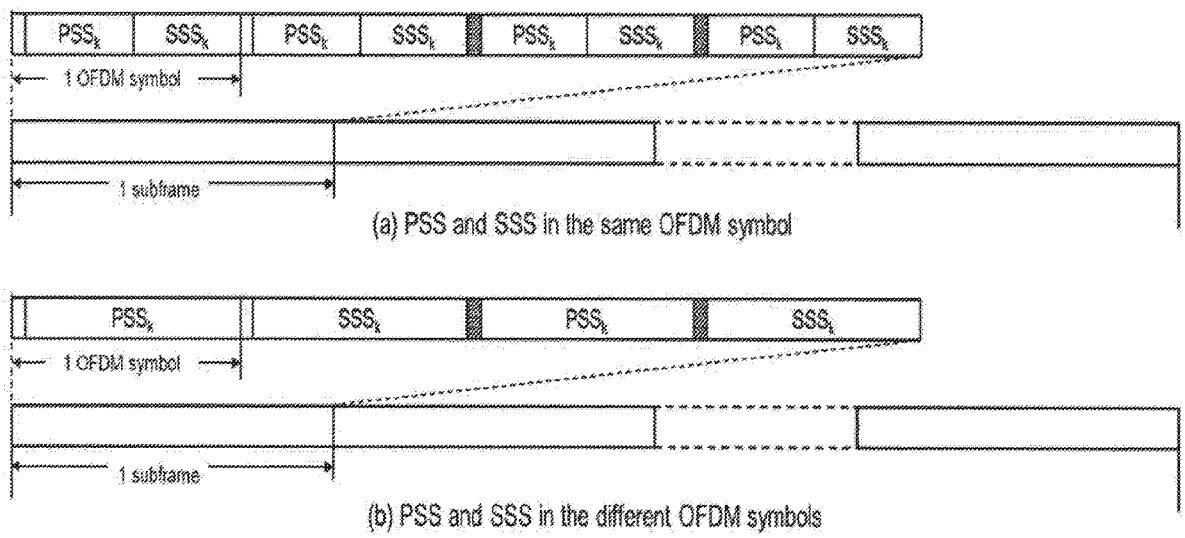
FIG. 7, showing exemplary PSS/SSS allocation with interleaving order to indicate OFDM symbol index in one subframe.

It may exemplarily be assumed that there are multiple NR-PSSs and NR-SSSs signals or bursts in one subframe, which can support multiple beam sweeping in NR as illustrated in FIG. 7. FIG. 7 (a) shows the case in which NR-PSS and NR-SSS are combined and inserted into one OFDM symbol, and (b) shows the case that PSS is followed by SSS in separate OFDM symbols.

Note that the relationship between NR-PSS and NR-SSS could be flexible. The NR-SSS in all OFDM symbols in the subframe may have the same component sequences (although they may be in different order), and may indicate the same explicit information, e.g., cell ID, together with the NR-PSS sequence.

From a UE's point of view, based on the NR-PSS and NR-SSS detection, explicit information, e.g., cell ID, and the OFDM symbol level synchronization are obtained. To derive the subframe level synchronization, the interleaving order of the component sequences of NR-SSS is considered. The mapping between the interleaving order and the allocated OFDM symbol index in one subframe may be pre-defined.

Once the UE knows about the order, the subframe start point can be derived, which will be the basic time synchronization for the following system information acquisition and random access procedure.

A SS block time index is discussed in the following.

This design can be regarded as the extension of the above design. Here the 'SS block' can be regarded a combination of NR-PSS, NR-SSS and other key system information, such as for a MIB (Master Information Block) carried or transmitted on NR-PBCH (Physical Broadcast Channel).

They are transmitted within one block to have allow uniform processing, such as beamforming.

Figure 8:
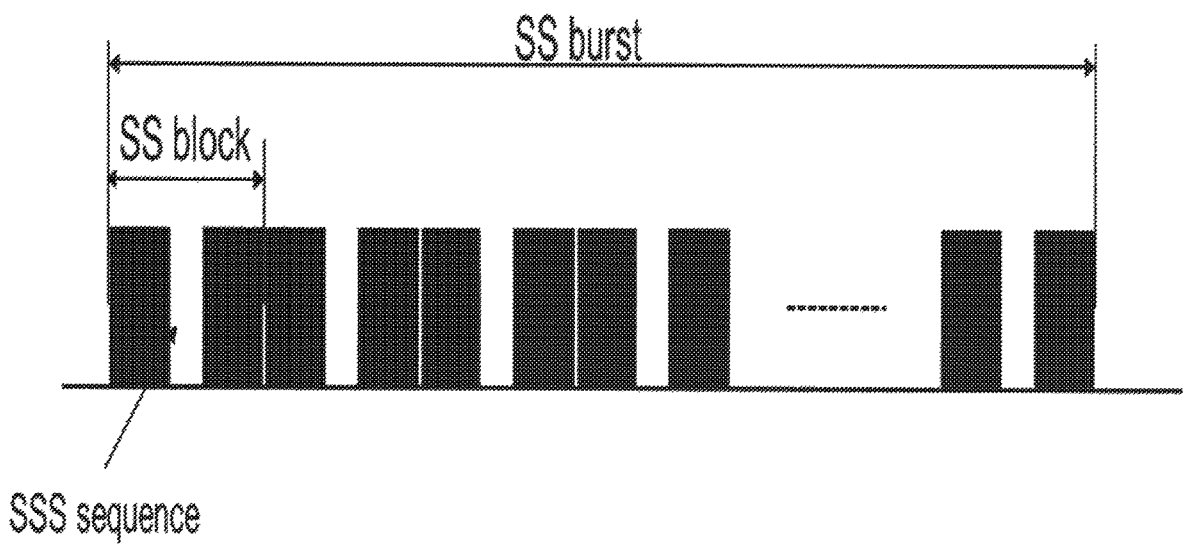
FIG. 8, showing a SS block with interleaving order to indicate a time index in one SS burst.

In this design, there is one unique NR-SSS sequence with an interleaving order inserted to indicate the time index in one SS burst as illustrated in FIG. 8. Based on the time index, the UE can obtain the system synchronization for the following signals and channels such as random access procedure, timing for other broadcast channels and time positions for paging messages.

In one embodiment, the position of one of the sequences e.g. $SSC_{k_0}^{(0)}$, is used to indicate the number of a subframe within a radio frame. Then the position of a second sequence, e.g. $SSC_{k_1}^{(1)}$ may be used to indicate OFDM symbol position within a sub-frame.

SS burst periodicity is discussed in the following.

Note that the order in the interleaving can be used to implicitly indicate other key system information without extra and explicit information bits, such as the indication for the periodicity of the SS burst occasion.

In this design, the SS burst is designed to support multiple periodicities, which may be beneficial regarding different requirements on the system information acquisition delay. If the acquisition delay is expected to be as quick as possible, the periodicity of the SS block including the basic system information needs to be small. Otherwise, it can be larger to reduce the energy consumption and interference.

Therefore, it is necessary to flexibly deliver the periodicity to UE to detection, and the method proposed in this disclosure can facilitate the deployments.

The mapping between the interleaving order and the periodicity of SS burst is predefined, and UE can derive the periodicity according to the detection on the interleaving order, and prepare to detect the SS burst occasion when reaching the periodicity.

In a variant, the periodicity of SS blocks can be indicated by the number of interleaved sequences. Here two interleaved sequences can be used to indicate a 5 ms periodicity. An interleaving with three sequences may be used to indicate a periodicity of 10 ms (or any other predefined number). Four interleaved sequences may be used for yet another periodicity (e.g. 20 ms).

The proposed synchronization signal is the NR-SSS sequence transmitted with interleaving order to deliver the system information, such as OFDM symbol offset, SS block time index and others.

It should be noted that the interleaving order can be changed between transmitting the same overall sequence repeatedly, such that information may be included by providing different orders of the same sequence components a plurality of times.

Figure 9:
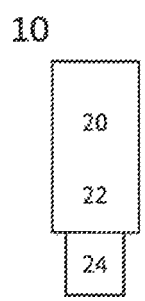
FIG. 9, showing an exemplary user equipment.

FIG. 9 schematically shows a terminal 10, which may be implemented as a UE (User Equipment). Terminal 10 comprises processing circuitry (which may also be referred to as control circuitry) 20, which may comprise a controller connected to a memory. Any module of the terminal, e.g. a determining and/or receiving module, may be implemented in and/or executable by, the processing circuitry 20, in particular as module in the controller. Terminal 10 also comprises radio circuitry 22 providing receiving and transmitting or transceiving functionality (e.g., one or more transmitters and/or receivers and/or transceivers), the radio circuitry 22 being connected or connectable to the control circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network, e.g. a RAN as described herein. Terminal 10 may generally be adapted to carry out any of the methods for operating a terminal or UE disclosed herein; in particular, it may comprise corresponding circuitry, e.g. processing circuitry, and/or modules.

Figure 10:
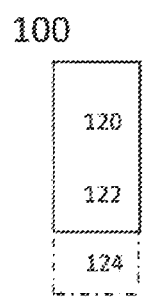
FIG. 10, showing an exemplary network node.

FIG. 10 schematically shows a network node 100, which in particular may be an eNB, or gNB or similar for NR. Network node 100 comprises processing circuitry (which may also be referred to as control circuitry) 120, which may comprise a controller connected to a memory. Any module, e.g. transmitting module and/or configuring module of the network node 100 may be implemented in and/or executable by the processing circuitry 120. The processing circuitry 120 is connected to control radio circuitry 122 of the radio node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. processing circuitry, and/or modules. The antenna 124 circuitry may be connected to and/or comprise an antenna array. The network node 100, respectively its circuitry, may be adapted to transmit configuration data and/or to configure a terminal as described herein.

Configuring a user equipment or terminal may comprise transmitting, to the UE or terminal, signaling comprising configuration data indicating the configured information or a configuration, in particular a mapping. The data may indicate the information directly (e.g., by explicitly including or representing it) or indirectly (e.g., by providing a pointer to the information and/or indexing a table). The signaling may comprise one or more individual signal/s or may be in a message, which may indicate additional information.

A cell may be generally a communication cell, e.g., of a cellular or mobile communication network, provided by a node. A serving cell may be a cell on or via which a network node (the node providing or associated to the cell, e.g., base station or eNodeB or gNodeB) transmits and/or may transmit synchronisation signaling and/or data to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

In some variants, synchronisation signaling may comprise primary and secondary synchronisation signaling.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or LTE Evolution or NR mobile or wireless or cellular communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

Some useful abbreviations comprise:

| Abbreviation | Explanation |
| --- | --- |
| UE | User equipment |
| LTE | Long term evolution |
| NR | New Radio |
| 3GPP | 3rd Generation Partnership Project |
| DL | Downlink |
| UL | Uplink |
| DC | Digital current |
| 5G | $5^{th}$ generation of radio technology |

What is claimed is:

1. A method for operating a network node in a radio access network, the method comprising:
 transmitting synchronization signaling;
 the synchronization signaling comprising:
  a signaling sequence, the signaling sequence being determined as a combination of a number of sub-sequences, each sub-sequence being chosen from a set of subsequences; and
  an order of the sub-sequences being mapped to synchronization information; and
 the synchronization signaling repeating the signaling sequence determined as a combination of a number of sub-sequences within a synchronization signaling block.

2. The method of claim 1, wherein the synchronization signaling repeats, within a time interval, the signaling sequence.

3. The method of claim 2, wherein the time interval one of comprises and represents at least one of a subframe, a slot, and a transmission time interval.

4. The method of claim 1, wherein the signaling sequence is mapped to different subcarriers of the same symbol or different symbols.

5. The method of claim 1, wherein each set of subsequences is different from the other sets.

6. The method of claim 1, wherein a sub-sequence from each set is mapped to a subcarrier.

7. A network node for a radio access network, the network node comprising:
 processing circuitry;

memory containing instructions executable by the processing circuitry whereby the network node is configured to:
transmit synchronization signaling;
the synchronization signaling comprising:
a signaling sequence, the signaling sequence being determined as a combination of a number of sub-sequences, each sub-sequence being chosen from a set of subsequences; and
an order of the sub-sequences being mapped to synchronization information; and
the synchronization signaling repeating the signaling sequence determined as a combination of a number of sub-sequences within a synchronization signaling block.

8. The network node of claim 7, wherein the instructions are such that the network node is configured to transmit the synchronization signaling such that the synchronization signaling repeats, within a time interval, the signaling sequence.

9. The network node of claim 8, wherein the time interval one of comprises and represents at least one of a subframe, a slot, and a transmission time interval.

10. The network node of claim 7, wherein the instructions are such that the network node is configured to transmit the synchronization signaling such that the signaling sequence is mapped to different subcarriers of the same symbol or different symbols.

11. A method for operating a user equipment in a radio access network, the method comprising:
determining synchronization information based on received synchronization signaling;
the synchronization signaling comprises:
a signaling sequence, which is composed of a combination of a number of sub-sequences, each sub-sequence being chosen from a set of subsequences; and
an order of the sub-sequences being mapped to the synchronization information; and
the synchronization signaling repeating the signaling sequence determined as a combination of a number of sub-sequences within a synchronization signaling block.

12. The method of claim 11, wherein the synchronization signaling repeats, within a time interval, the signaling sequence.

13. The method of claim 12, wherein the time interval one of comprises and represents at least one of a subframe, a slot, and a transmission time interval and one of a synchronization signaling block, a synchronization signaling burst and a burst set.

14. The method of claim 11, wherein the signaling sequence is mapped to different subcarriers of the same symbol or different symbols.

15. The method of claim 11, wherein a sub-sequence from each set is mapped to a subcarrier.

16. A user equipment for a radio access network, the user equipment comprising:
processing circuitry;
memory containing instructions executable by the processing circuitry whereby the user equipment node is configured to:
determine synchronization information based on received synchronization signaling;
the synchronization signaling comprising:
a signaling sequence, which is composed of a combination of a number of sub-sequences, each sub-sequence being chosen from a set of subsequences; and
an order of the sub-sequences being mapped to the synchronization information; and
the synchronization signaling repeating the signaling sequence determined as a combination of a number of sub-sequences within a synchronization signaling block.

17. The user equipment of claim 16, wherein the synchronization signaling repeats, within a time interval, the signaling sequence.

18. The user equipment of claim 17, wherein the time interval one of comprises and represents at least one of a subframe, a slot, and a transmission time interval.

19. The user equipment of claim 16, wherein the signaling sequence is mapped to different subcarriers of the same symbol or different symbols.

* * * * *